United States Patent [19]

Kramer

[11] Patent Number: 4,570,315
[45] Date of Patent: * Feb. 18, 1986

[54] METHOD OF MAKING A BEARING

[75] Inventor: James H. Kramer, Akron, Ohio

[73] Assignee: The B. F. Goodrich Company, Akron, Ohio

[*] Notice: The portion of the term of this patent subsequent to Aug. 17, 1999 has been disclaimed.

[21] Appl. No.: 472,532

[22] Filed: Mar. 7, 1983

[51] Int. Cl.$^4$ .............................................. B21D 53/10
[52] U.S. Cl. ........................... 29/149.5 S; 29/149.5 C; 384/98; 156/192; 156/264
[58] Field of Search ............... 29/149.5 S, 149.5 NM, 29/149.5 A, 149.5 C, 148.4 R; 384/97, 98, 298; 156/189, 192, 264

[56] References Cited

U.S. PATENT DOCUMENTS

| | | | |
|---|---|---|---|
| 3,746,414 | 7/1973 | Sudyk et al. | 384/98 |
| 3,772,120 | 11/1973 | Radzins | 156/264 |
| 3,993,371 | 11/1976 | Orndorff, Jr. | 384/97 X |
| 4,344,806 | 8/1982 | Kramer | 156/192 X |

Primary Examiner—Howard N. Goldberg
Assistant Examiner—John T. Burtch
Attorney, Agent, or Firm—Joseph Januszkiewicz

[57] ABSTRACT

The method of making a non-metallic bearing assembly by initially molding a flat longitudinally extending sheet of rubber containing a ply or plies of fiberglass reinforced fabric therein, then cutting such sheet into a plurality of strips. The flat strips are then located around the periphery of a mandrel that is then wound with fabric which is impregnated with epoxy resin, then cured and machined to a cylindrical bearing.

7 Claims, 6 Drawing Figures

METHOD OF MAKING A BEARING

BACKGROUND OF THE INVENTION

This invention relates to a bearing assembly and more particularly to elastomeric journal bearing assemblies which are adapted for marine propeller shafts. Elastomeric journal bearings have been found to be particularly suited for this purpose because of their exceptional ability to withstand the harmful effects of corrosive fluids and to abrasion resulting from bits of foreign materials which are carried in suspension in the sea water or other liquids in which the shaft and journal bearing assembly operates. Such elastomeric journal bearing assemblies have been made and are still being made with rigid metallic non-corrosive support members but these rigid metallic materials are more expensive and their corresponding manufacturing costs are higher. A further advantage of the elastomeric journal bearing is that since they operate in a liquid medium they are self lubricated and therefore highly desirable for marine use as for the stern propeller shaft journals.

The present invention provides a new and novel method for making an improved elastomeric journal bearing utilizing a novel outer shell and inner shell wherein the integral assembly provides a plurality of circumferentially spaced radially inwardly extending projections that provides support for the shaft and a plurality of water wedges for lubricating purposes rather than have the plural supports operate as squeegees which would wipe the lubricant off. The method employs a flat molding process that is combined with a winding process whereby a fiberglass reinforced rubber or elastomeric shell is further supported by a fiberglass reinforced plastic which provides a rigid outer housing for the inner flexible spaced supports. A unique advantage of the present invention is to materially reduce the cost of fabricating the fiberglass reinforced plastic inner supports of the bearing and to reduce the stock of inventory required to be carried to service the industry because of the versatility of the process. In addition, the outside diameter of the finished bearing can be machined to a desired diameter and additional layers of fiberglass reinforced plastic can be molded back onto the outer shell by a simple winding process to increase its dimensions to any desired size and thereafter stored for subsequent machining and use. This process is simple and can provide means for accurately sizing the outer diameter without the use of expensive molding processes. Applicant's process also permits the manufacture of a given size of flat strips of fiberglass-rubber reinforced sheets which can be stored and when needed can be cut to the desired size, wound and molded and then machined to the precise dimension. The cutting of the strips of fiberglass reinforced rubber to the desired sizes such as staves permits greater flexibility in the manufacturing process and eliminates the need for many size molds.

SUMMARY OF THE INVENTION

The present invention is directed to a new and improved process for fabricating an elastomeric bearing with a rigid non-metallic outer shell by initially molding a flat longitudinally extending support member that is a solid continuous sheet of rubber containing a fiberglass ply that reinforces the rubber sheet. The molded sheet is then cut into strips and then the strips are placed in circumferentially spaced relationship on a mandrel such that the strips have a clearance space between them as they are located on such mandrel having a generally cylindrical contour with a plurality of circumferentially spaced flat faces. The spaced strips as so located are then wrapped with a fiberglass sheet that is impregnated with an epoxy resin to complete the elastomeric journal bearing assembly.

DETAILED DESCRIPTION

Figure 1:
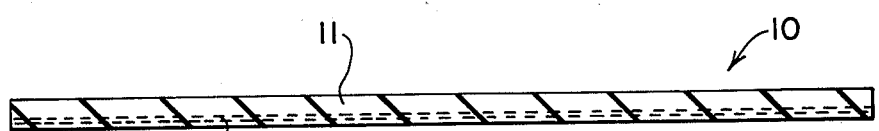
FIG. 1 is a side elevational view in cross section of a molded flat sheet of rubber having a fiberglass reinforcing ply located therein.
Figure 2:
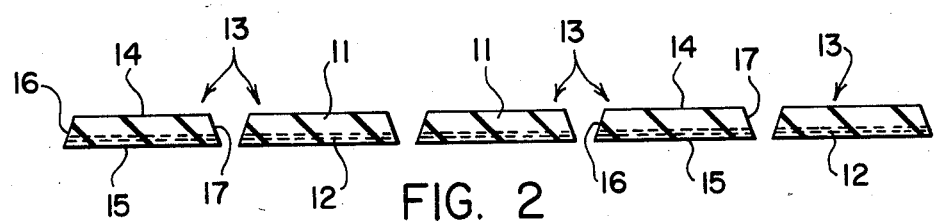
FIG. 2 is a side elevational view of the fiberglass reinforced rubber sheet of FIG. 1 cut into a plurality of trapezoidal shaped strips as one of the steps of fabricating an elastomeric journal bearing assembly.

Referring to the drawings, wherein like reference numerals designate like or corresponding parts throughout the several views, there is shown in FIG. 1 a cross-sectional view of a molded flat sheet 10 of rubber 11 having a fiberglass reinforcing ply 12 embedded therein. To prepare such molded flat sheet 10, a sheet or several sheets of elastomeric material such as nitrile rubbers such as polymers of butadiene and acrylonitrile is placed flat in a mold. A fiberglass fabric reinforced rubber sheet or ply 12 is then placed over the sheet or sheets of elastomeric material to form a thin layer. The reinforcing ply 12 can be a single thin sheet of fiberglass or multiple plies thereof. Additional layers or thicknesses of elastomeric materials such as rubber are then placed on top of such reinforcing ply or plies and thence vulcanized into an elongated continuous resilient strip of fiberglass reinforced rubber or elastomer sheet 10. Such elastomeric material may be made from a suitable natural, synthetic rubber or a rubber having a combination of these materials that can be vulcanized to exhibit a low coefficient of friction when lubricated with water. The elastomeric material should have adequate resiliency, strength and sufficient heat resisitance to withstand a temporary absence of lubricating liquids as at start-up. As an example of acceptable elastomers for use are conventional nitrile rubber compositions, particularly rubber compositions comprising polymers of butadiene and acrylonitrile where butadiene is the major component of the polymer. Natural and other synthetic rubber compositions are available for such use provided they have the properties discussed above.

The fiberglass fabric covered with rubber is the preferred form of the invention although other fabrics may be used to provide a multi-layered laminate such that the cords of the fabric are reinforced with elastomeric materials. The term cords includes cords, strands and similar materials. The fiberglass cords are particularly suitable as a material since it will not corrode or shrink. Further, these cords will not absorb water or fluids. Such fiberglass fabric is reinforced with a copolymer of butadiene and acrylonitrile rubber cement as by dipping, spraying or by brushing into and on, and then allowed to dry to provide the resilient ply or layer composed of fiberglass impregnated with rubber. The number of fiberglass impregnated layers, plies or sheets 12 applied to the flat sheet at the bottom of a mold is determined by the strength desired. Curing or vulcanization of the composite structure is effected in a conventional manner well known in the art.

Such continuous longitudinally extending molded sheet is then cut into individual strips 13 of trapezoidal shape having an upper flat surface 14, a lower flat surface 15 and a pair of side surfaces 16 and 17. The spaced upper and lower flat surfaces 14 and 15 are parallel while the side surfaces 16 and 17 are non-parallel.

Figure 3:
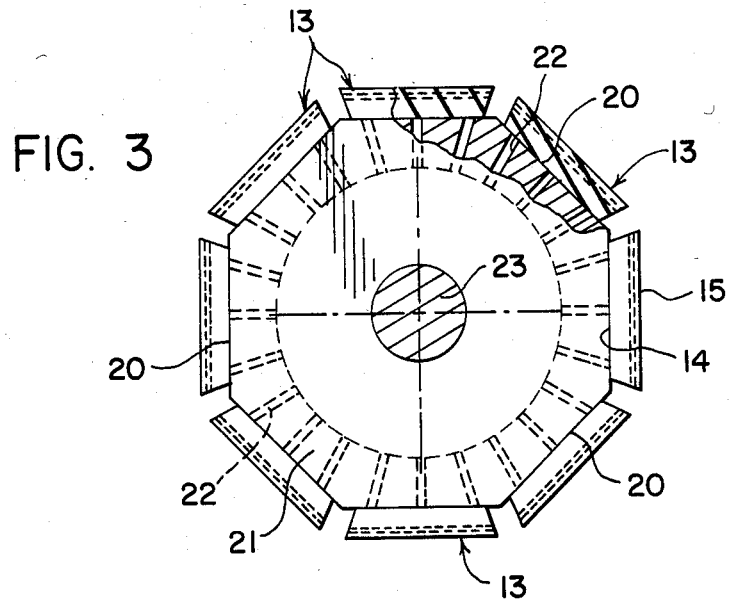
FIG. 3 is a schematic side elevational view of a mandrel with a plurality of circumferentially spaced fiberglass reinforced rubber strips thereon with a portion of such mandrel and strips broken away and shown in cross sectional form.

The trapezoidal shaped fiberglass reinforced strips 13 are thence placed on the flat faces 20 of a polygonal shaped mandrel 21 with the upper flat surfaces 14 in abutting contact therewith and becomming the inner radially disposed surfaces. The lower flat faces 15 becomes the outer radially disposed surfaces on the mandrel. The strips 13 are retained in the mandrel 21 in any of several manners. As seen in FIG. 3, a plurality of radially extending bores 22 in mandrel 21 have one end communicating with the respective faces 20 and the other end connnecting with a suitable vacuum source in a manner well known in the art such that upon pulling of a vacuum therethrough the vacuum will retain the strips 13 on the mandrel 21. The bores 22 may be axially disposed as well as radially disposed to provide sufficient contact to the inner surfaces of the strips 13.

Figure 5:
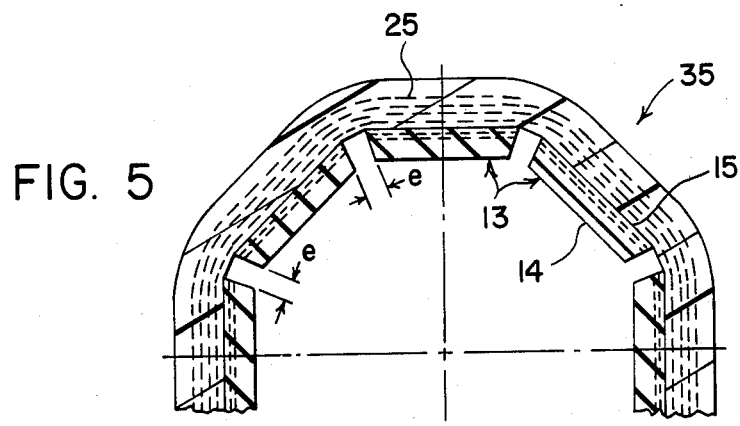
FIG. 5 is a side elevational view in cross section of a portion of a cured elastomeric journal bearing assembly after removal from a mandrel.

Mandrel 21 is supported by a shaft 23 suitably powered by means not shown but old and well known in the art. The number of flat outer faces on mandrel 21 is determined by the number of strips 13 desired as well as by the diameter of the final finished product. A woven fabric of fiberglass 25 is then wound onto the outer peripheral surfaces of the circumferentially spaced strips 13 that are held on the mandrel 21. The clearance space "e" (FIG. 5) between the respective strips 13 on the mandrel is determined by the cut made on the vulcanized molded fiber reinforced sheet and the size of mandrel 21 being used. The width of the strips can be such as to maintain a small clearance "e" or a large clearance space, thereby enhancing the versatility of the method of fabricating the bearings under the described method.

As the fiberglass 25 is wound thereon, the fabric is coated with an epoxy resin from a reservoir 30 with the aid of a doctor blade 32. The epoxy resin can be applied manually or by any known mechanical means. The number of layers of impregnated fiberglass 25 that is applied around the outer surfaces of the circumferentially spaced strips 13 is determined by the desired size needed for the specific application. It is to be noted, that the finished product, a bearing unit 35, after the winding and the setting of the epoxy resin may not have a true outer circle but rather is a polygonal shape. Such bearing unit can then be machined to have a true cylinderical outer shape as herein after described.

A specific example of the epoxy resin useful in the present invention is one by the tradename "APCO" available from Applied Plastics Co., Inc. of 612 Franklin Ave., El Segundo, Calif. 90245. The epoxy resin has a specific gravity of 1.165 and its accompanying curing agent or hardener has a specific gravity of 1.809. The epoxy resin has a shore D 25° C. hardness of 84 with a glass transition temperature of 196° F. The viscosity of the epoxy resin is 2000 cps (1800±300); while the viscosity of the hardener is 410 cps (310±200). Another epoxy resin that can be used is one known as "EVER-FIX EPOXY RESIN" having a density of 8.5 lbs. per gallon. The hardener used with such epoxy resin is a modified alaphatic amine adduct available through Fibre Glass-Evercoat Co., Inc., 6600 Cornell Rd., Cincinnati, Ohio 45242.

Figure 4:
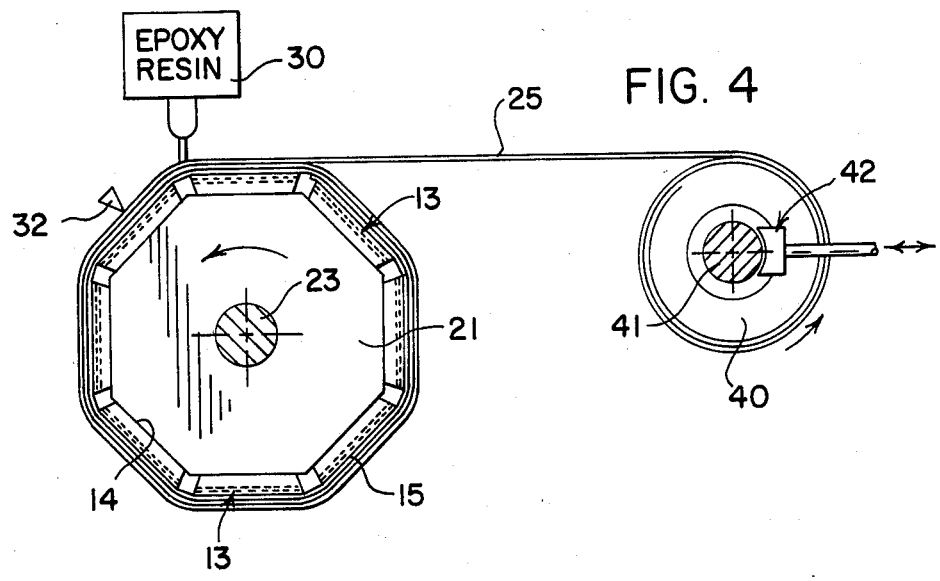
FIG. 4 is a schematic side elevational view partly in section, depicting the wrapping of fiberglass fabric onto the circumferentially spaced strips of fiberglass reinforced rubber while impregnating the wrapping with epoxy resin.

The fiberglass fabric 25 is supplied from a storage roll 40 supported on an axle or shaft 41 driven in synchronism with shaft 23. A brake mechanism 42 is shown in FIG. 4 as cooperative with shaft 41 to facilitate the winding operation. To effect the curing of the bearing unit 35 so formed, the mandrel 21 is slowly rotated until cure of the epoxy resin is effected. The outer shell of the bearing unit 35 comprising the wound fiberglass fabric 25 impregnated with the epoxy resin is referred to as an FRP shell or outer shell wherein the FRP refers to fiberglass reinforced plastic surrounding the inner shell of FRR (fiberglass reinforced rubber).

Figure 6:
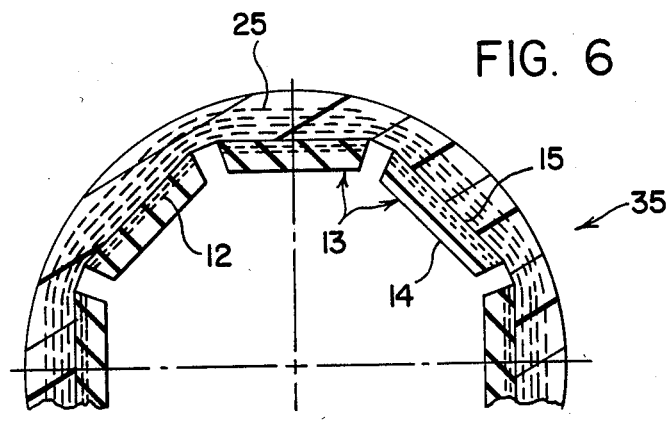
FIG. 6 is a side elevational view in cross section of a portion of a machined elastomeric journal bearing assembly as depicted by FIG. 5.

After the bearing unit 35 has hardened, the unit 35 is removed from the mandrel 21 and machined to a desired round dimension as shown in FIG. 6. In the event that the bearing unit 35 has been machined to a lesser dimension than desired, additional epoxy impregnated fabric 25 is wound back onto the bearing and after such epoxy resin has hardened the bearing unit 35 is machined to its desired dimension.

Thus the method of fabricating a journal bearing unit 35 as described above is considerably more efficient and cost effective when compared to those presently available.

Various modifications are contemplated and may be resorted to by those skilled in the art without departing from the described invention, as hereinafter defined by the appended claims, as only a preferred embodiment thereof has been disclosed.

I claim:

1. A method of fabricating a bearing assembly comprising the steps of building a flat rectangular sheet of fiberglass reinforced ply with an elastomer therethrough; vulcanizing said fiberglass reinforced elastomer into a flat sheet; cutting said vulcanized sheet of fiberglass reinforced elastomer into a plurality of strips; abutting a plurality of said fiberglass reinforced elastomer strips onto a polygonal shaped mandrel to form a circumferential hoop with a clearance space between the respective strips; retaining said strips on said mandrel with said clearance space between strips while simultaneously rotating said mandrel and (while) wrapping a fiber fabric onto the outer circumference of said circumferentially spaced strips; (and) impregnating the fiber fabric with a plastic resin while wrapping said fabric; and curing said resin to complete a fiber reinforced plastic outer shell on said circumferentially spaced strips to make a bearing assembly.

2. A method of fabricating a bearing assembly as set forth in claim 1 wherein said completed bearing assembly is machined to a predetermined diameter.

3. A method of fabricating a bearing assembly as set forth in claim 2 wherein said vulcanized flat sheet of fiberglass is cut into a plurality of trapezoidal strips.

4. A method of fabricating a bearing as set forth in claim 3 wherein said fiber fabric contains fiberglass.

5. A method of fabricating a bearing assembly comprising the steps of placing a flat sheet of an elastomer in a mold; placing a fiber reinforced ply of rubber onto said flat sheet; thence placing a thick layer of elastomeric material onto said ply of fiber reinforced rubber; vulcanizing said sheet, ply and layer into a composite horizontally extending elastomeric fiber reinforced sheet member; cutting said sheet member into a plurality of fiber reinforced elastomeric strips; mounting said strips onto a mandrel having a plurality of circumferentially spaced flat surfaces while maintaining a clearance space between adjacent strips; winding a fiber fabric around said circumferentially spaced fiber reinforced strips on said mandrel to form an annular sleeve while simultaneously impregnating the fiber fabric with a plastic resin while winding said fiber fabric; and curing said resin to complete a fiber reinforced outer sleeve onto said circumferentially spaced strips.

6. A method of fabricating a bearing assembly as set forth in claim 5 wherein said cured outer sleeve is machined to a cylindrical shape of a predetermined diameter.

7. A method of fabricating a bearing assembly as set forth in claim 6 wherein said sheet member is cut into a plurality of trapezoidal shaped elastomeric strips.

* * * * *